US010387159B2

United States Patent
Agron et al.

(10) Patent No.: US 10,387,159 B2
(45) Date of Patent: Aug. 20, 2019

(54) APPARATUS AND METHOD FOR ARCHITECTURAL PERFORMANCE MONITORING IN BINARY TRANSLATION SYSTEMS

(71) Applicant: Intel Corporation, Santa Clara, CA (US)

(72) Inventors: Jason M Agron, San Jose, CA (US); Polychronis Xekalakis, San Jose, CA (US); Paul Caprioli, Hillsboro, OR (US); Jiwei Oliver Lu, Pleasanton, CA (US); Koichi Yamada, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 321 days.

(21) Appl. No.: 14/614,264

(22) Filed: Feb. 4, 2015

(65) Prior Publication Data

US 2016/0224348 A1 Aug. 4, 2016

(51) Int. Cl.
*G06F 8/52* (2018.01)
*G06F 9/38* (2018.01)
(Continued)

(52) U.S. Cl.
CPC ............ *G06F 9/3842* (2013.01); *G06F 8/52* (2013.01); *G06F 9/4552* (2013.01); *G06F 11/3466* (2013.01); *G06F 11/36* (2013.01)

(58) Field of Classification Search
CPC .............................. G06F 9/3842; G06F 9/4552
See application file for complete search history.

(56) References Cited

U.S. PATENT DOCUMENTS 9,244,686 B2 * 1/2016 Henry .................. G06F 9/4401
9,317,288 B2 * 4/2016 Henry ................. G06F 9/30174
(Continued)

OTHER PUBLICATIONS

Srikant, Y. N., and P. Shankar. The Compiler Design Handbook: Optimizations and Machine Code Generation. Boca Raton, FL: CRC, 2003. Print. (pp. 302-305, 312, 320, 535, 551-559, 669-673).*
(Continued)

*Primary Examiner* — Aimee Li
*Assistant Examiner* — Andrew J Cromer
(74) *Attorney, Agent, or Firm* — Nicholson De Vos Webster & Elliott LLP

(57) ABSTRACT

Methods and apparatuses relate to emulating architectural performance monitoring in a binary translation system. In one embodiment, a processor includes an architectural performance counter to maintain an architectural value associated with instruction execution, a register to store the architectural value of the architectural performance counter, binary translation logic to embed an architectural value from the architectural performance counter into a stream of translated instructions having a transactional code region and to store the architectural value into the register, and an execution unit to execute the transactional code region of the stream of translated instructions. The binary translation logic is configured to add the architectural value from the register to the architectural performance counter upon completion of the transactional code region of the stream of translated instructions. In one embodiment, a binary translation system overcomes software incompatibilities by using microarchitectural support to transparently and accurately emulate architectural performance counter behavior.

16 Claims, 12 Drawing Sheets

(51) Int. Cl.
*G06F 11/34* (2006.01)
*G06F 11/36* (2006.01)
*G06F 9/455* (2018.01)

(56) References Cited

U.S. PATENT DOCUMENTS

| | | | | |
|---|---|---|---|---|
| 9,378,019 | B2* | 6/2016 | Henry | G06F 9/30076 |
| 2002/0073301 | A1* | 6/2002 | Kahle | G06F 9/3804 |
| | | | | 712/235 |
| 2008/0061985 | A1* | 3/2008 | Strzelczyk | G06K 7/10346 |
| | | | | 340/572.8 |
| 2009/0172654 | A1* | 7/2009 | Zhao | G06F 9/45516 |
| | | | | 717/158 |
| 2012/0227045 | A1* | 9/2012 | Knauth | G06F 9/3863 |
| | | | | 718/100 |
| 2012/0260067 | A1* | 10/2012 | Henry | G06F 9/30076 |
| | | | | 712/200 |
| 2013/0305014 | A1* | 11/2013 | Ebersole | G06F 9/30076 |
| | | | | 712/32 |
| 2014/0013089 | A1* | 1/2014 | Henry | G06F 9/30076 |
| | | | | 712/226 |
| 2014/0122843 | A1* | 5/2014 | Henry | G06F 9/30076 |
| | | | | 712/225 |
| 2014/0122847 | A1* | 5/2014 | Henry | G06F 9/4401 |
| | | | | 712/243 |
| 2015/0317338 | A1* | 11/2015 | Radovic | G06F 17/30985 |
| | | | | 707/695 |
| 2016/0202980 | A1* | 7/2016 | Henry | G06F 9/30025 |
| | | | | 712/213 |
| 2016/0202982 | A1* | 7/2016 | Muff | G06F 9/30145 |
| | | | | 712/208 |

OTHER PUBLICATIONS

Ebcioglu, Kemal, and Erik Altman. "DAISY: Dynamic Compilation for 100% Architectural Compatibility ." IBM Thomas J. Watson Research Center (1997): n. pag. ACM Digital Library. Web.*

Ebcioglu, K., J. Fritts, S. Kosonocky, M. Gschwind, E. Altman, K. Kailas, and T. Bright. "An eight-issue tree-VLIW processor for dynamic binary translation." Proceedings International Conference on Computer Design. VLSI in Computers and Processors (Cat. No. 98CB36273) (1998): n. pag. Web.*

Yang, Jiun, Jack Hung, and Wei Hsu. "A Static Binary Translator for Efficient Migration of ARM based Applications ." IEEE (2012): n. pag. IEEE. Web.*

"Intel 64 and IA-32 Architectures Software Developer's Manual vol. 3B: System Programming Guide, Part 2", Nov. 2006, Intel, vol. 3B, pp. [18-1 to 18-114] http://homes.di.unimi.it/sisop/lucidi0607/253669.pdf.*

* cited by examiner

APPARATUS AND METHOD FOR ARCHITECTURAL PERFORMANCE MONITORING IN BINARY TRANSLATION SYSTEMS

FIELD

This disclosure relates to microprocessors and, more particularly, to the emulation of architectural performance monitoring by binary translation technologies.

BACKGROUND

Architectural performance monitoring support through features such as architectural performance counters and last branch records allows an end-user to observe detailed information about currently executing software in an architecturally-defined manner (e.g., reading MSRs, or by streaming this information to memory). Binary translation systems take existing code and transform it in some way to a new set of binary code fragments, which are executed in place of the original code. In terms of an architectural performance counter, the new code fragments may bear no resemblance to the original code. For example, the number of instructions and/or branches in the translated code stream may be different from the original code stream or the addresses of control flow instructions and/or branches in the translated code may be different from the original code. Therefore, a binary translation system may create incompatibility between certain features (e.g., instructions retired, branch instructions retired, or branch misses retired) and an end-user. A binary translation system may also pose a security risk to itself by allowing an end-user to monitor architectural performance counter facilities and extract information about the binary translation system, for example, allowing addresses of translated code to be discovered may create opportunities for malicious attacks which may exploit a binary translation system's translation cache.

BRIEF DESCRIPTION OF THE DRAWINGS

The present invention is illustrated by way of example, and not by way of limitation, in the figures of the accompanying drawings in which like references indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

In one embodiment, a binary translation system overcomes security risks and architectural performance monitoring incompatibilities with non-binary translation systems by using microarchitectural support to transparently and accurately emulate architectural performance counter behavior, so as to hide any changes made by the binary translation system. In one embodiment, a high-performance architectural performance monitoring emulation service having a combination of enhanced hardware structures and hidden ISA support allows a binary translation system to faithfully emulate existing architectural performance monitoring features in a transparent manner.

Figure 1:
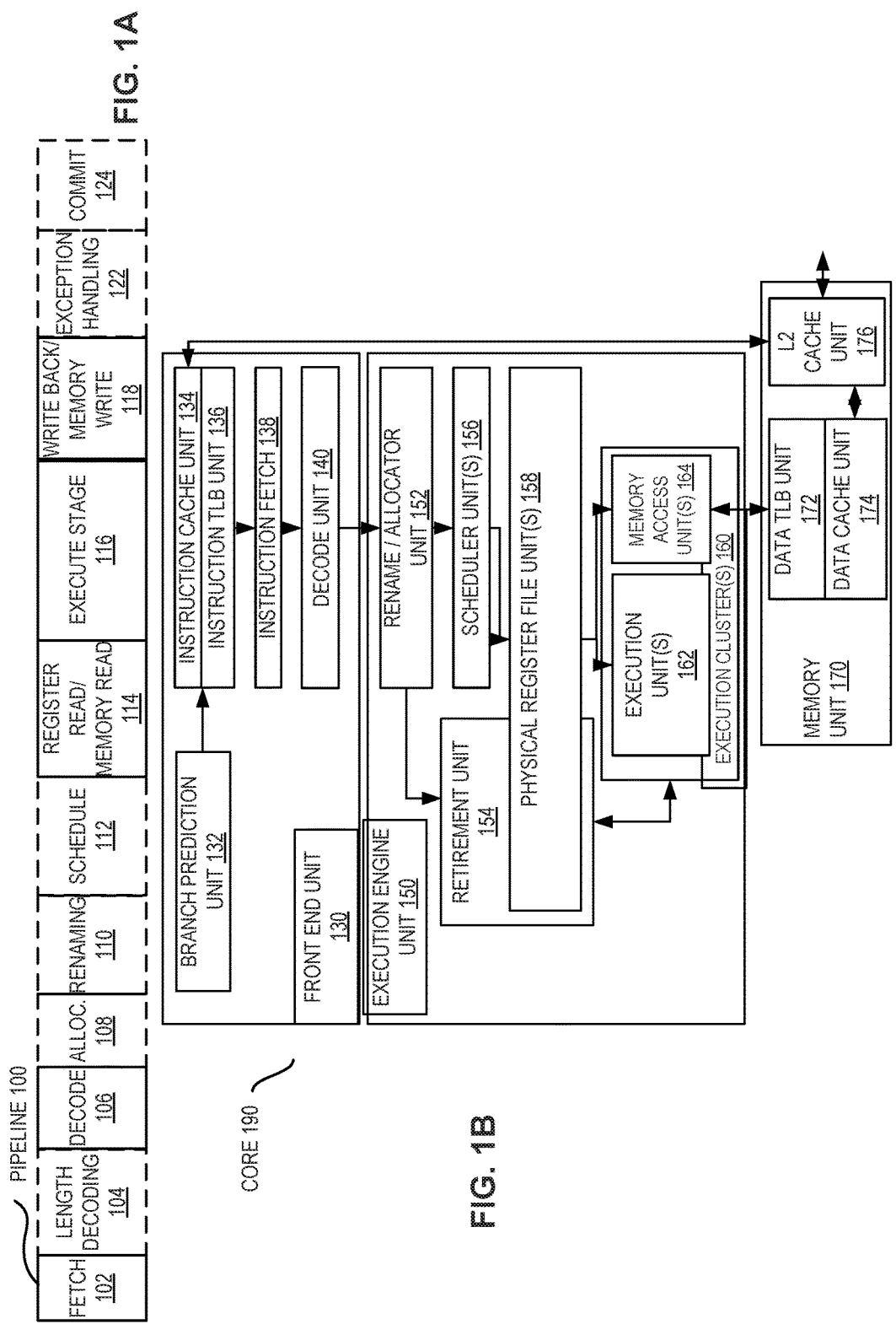
FIG. 1A is a block diagram illustrating both an exemplary in-order fetch, decode, retire pipeline and an exemplary register renaming, out-of-order issue/execution pipeline according to embodiments of the invention.
FIG. 1B is a block diagram illustrating both an exemplary embodiment of an in-order fetch, decode, retire core and an exemplary register renaming, out-of-order issue/execution architecture core to be included in a processor according to embodiments of the invention.

FIG. 1A is a block diagram illustrating both an exemplary in-order fetch, decode, retire pipeline and an exemplary register renaming, out-of-order issue/execution pipeline according to embodiments of the invention. FIG. 1B is a block diagram illustrating both an exemplary embodiment of an in-order fetch, decode, retire core and an exemplary register renaming, out-of-order issue/execution architecture core to be included in a processor according to embodiments of the invention. The solid lined boxes in FIGS. 1A-B illustrate the in-order portions of the pipeline and core, while the optional addition of the dashed lined boxes illustrates the register renaming, out-of-order issue/execution pipeline and core.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124. FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file unit(s) 158. Each of the physical register file units 158 represents one or more physical register files, different ones of which store one or more different data types, such as scalar integer, scalar floating point, packed integer, packed floating point, vector integer, vector floating point status (e.g., an instruction pointer that is the address of the next instruction to be executed), etc. In one embodiment, the physical register file unit 158 comprises a vector registers unit, a write mask registers unit, and a scalar registers unit. These register units may provide architectural vector registers, vector mask registers, and general purpose registers. The physical register file unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.).

The retirement unit 154 and the physical register file unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file unit(s) 158 and the memory unit 170 perform the register read/memory read stage 114; the execution cluster 160 perform the execute stage 116; 6) the memory unit 170 and the physical register file unit(s) 158 perform the write back/memory write stage 118; 7) various units may be involved in the exception handling stage 122; and 8) the retirement unit 154 and the physical register file unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
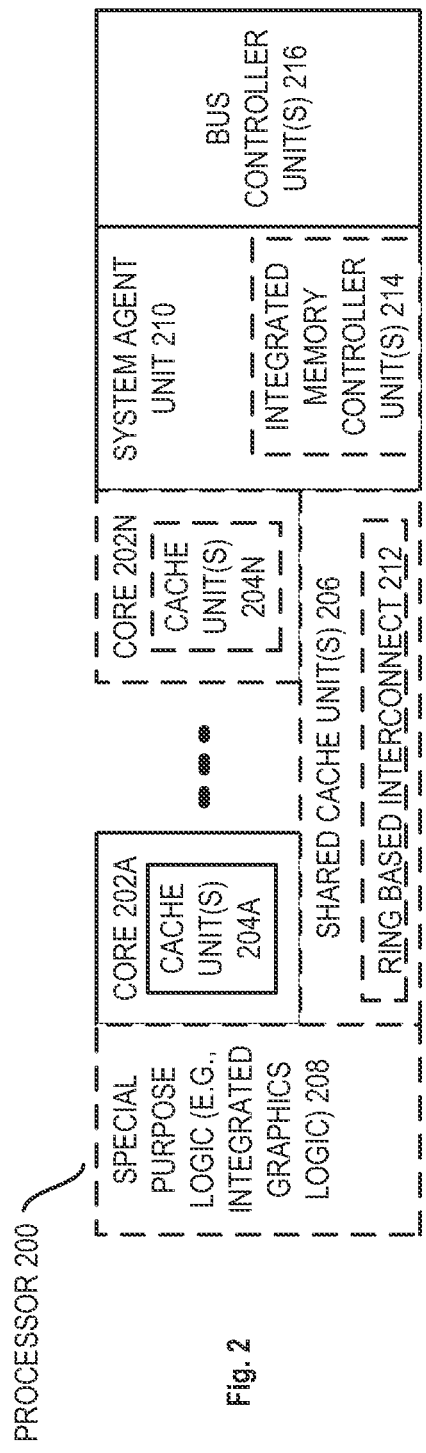
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache 204A-204N within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays. The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
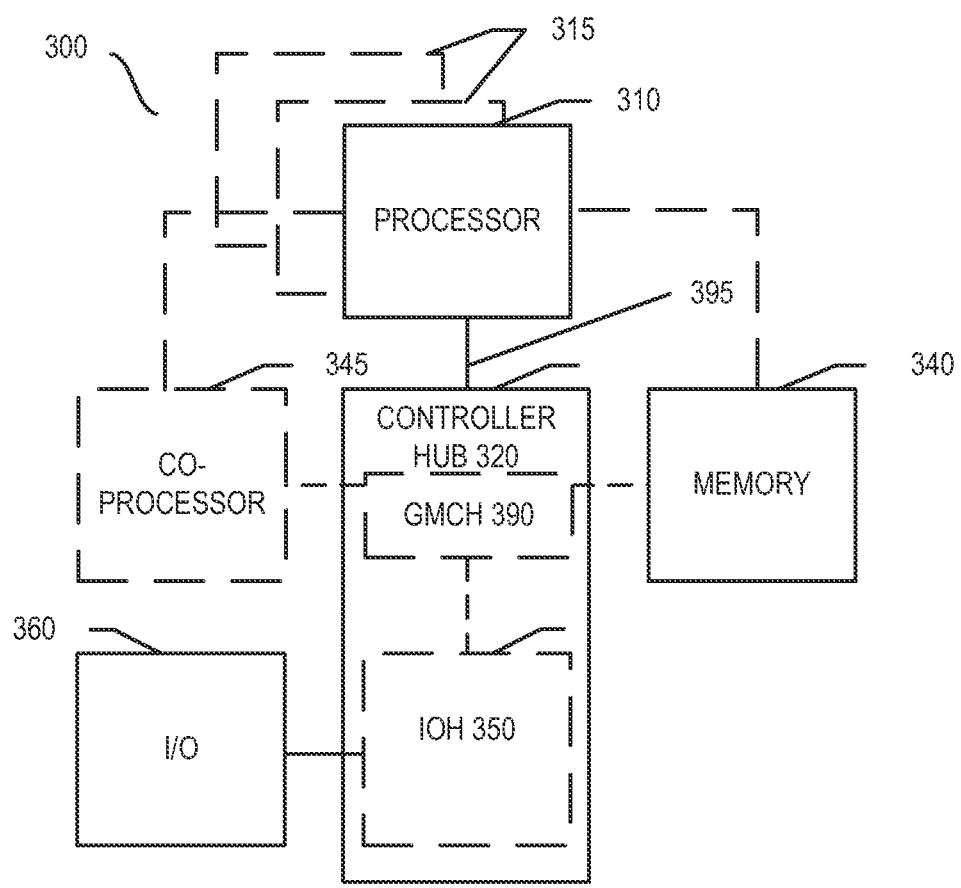
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200. The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395. In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator. There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
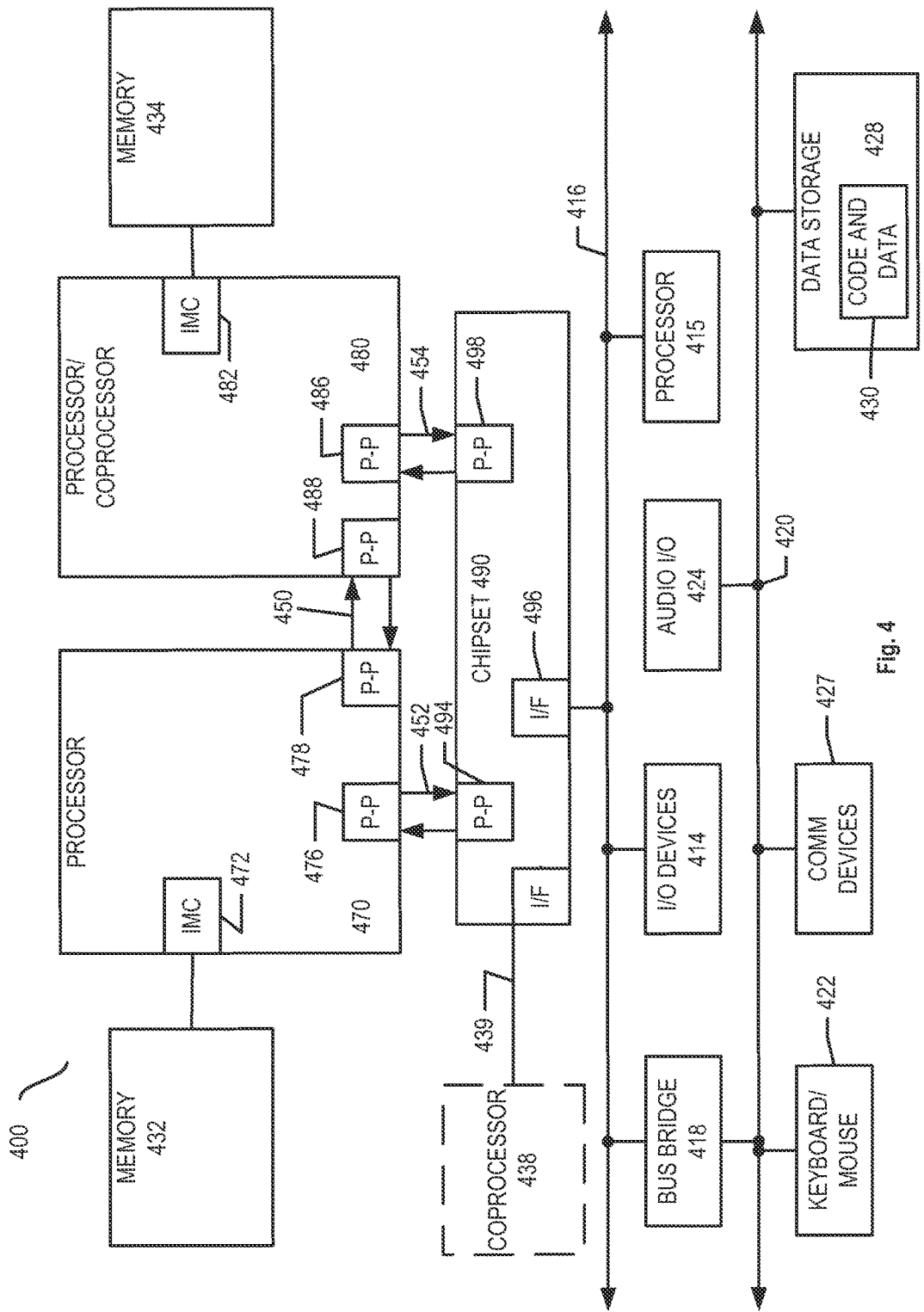
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors. Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
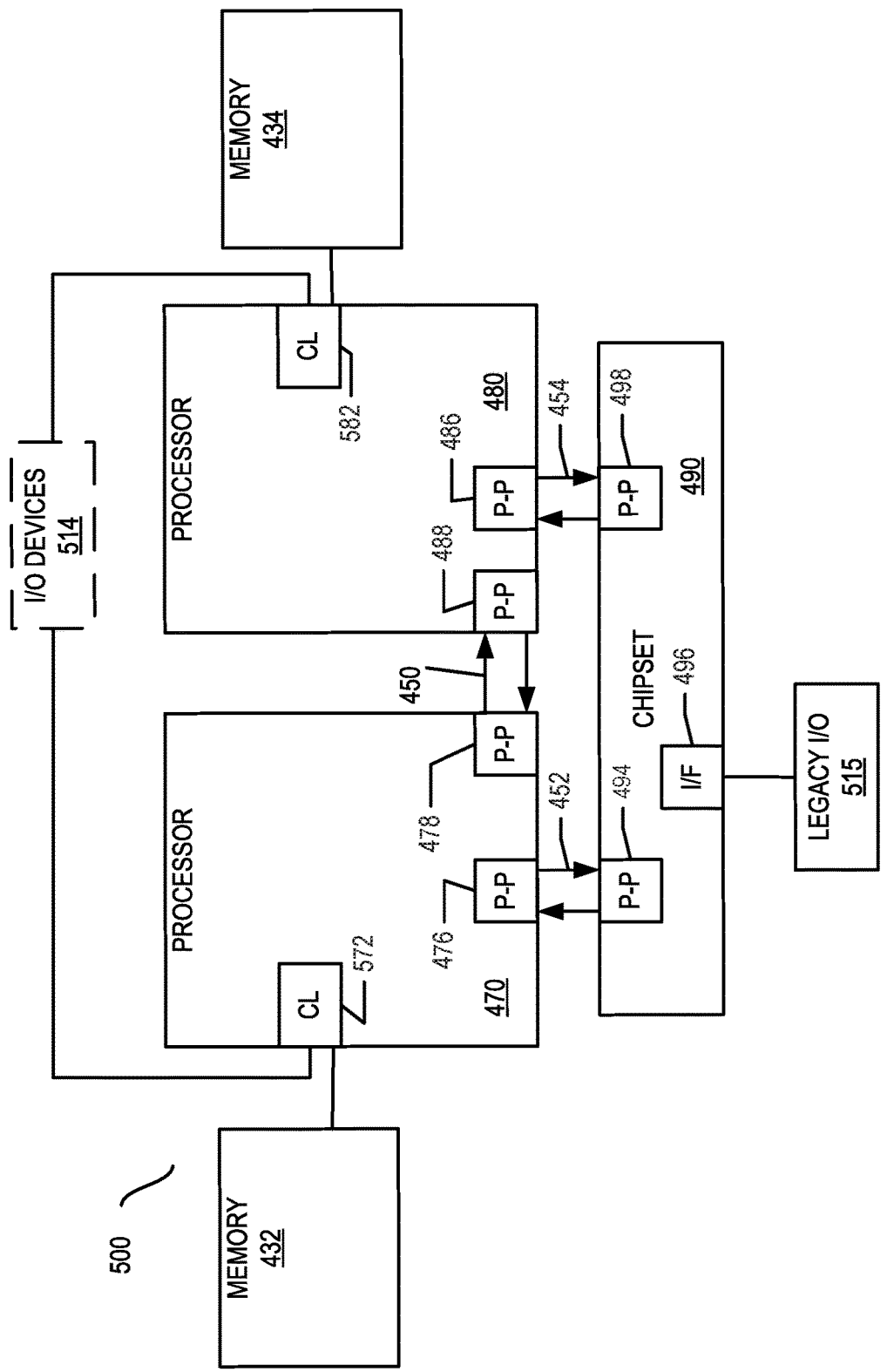
FIG. 5 illustrates a block diagram of a third system in accordance with an embodiment of the present invention.

Referring now to FIG. 5, shown is a block diagram of a second more specific exemplary system 500 in accordance with an embodiment of the present invention, Like elements in FIGS. 4 and 5 bear like reference numerals, and certain aspects of FIG. 4 have been omitted from FIG. 5 in order to avoid obscuring other aspects of FIG. 5. FIG. 5 illustrates that the processors 470, 480 may include integrated memory and I/O control logic ("CL") 572 and 582, respectively. Thus, the CL 572, 582 include integrated memory controller units and include I/O control logic. FIG. 5 illustrates that not only are the memories 432, 434 coupled to the CL 572, 582, but also that I/O devices 514 are also coupled to the control logic 572, 582. Legacy I/O devices 515 are coupled to the chipset 490.

Figure 6:
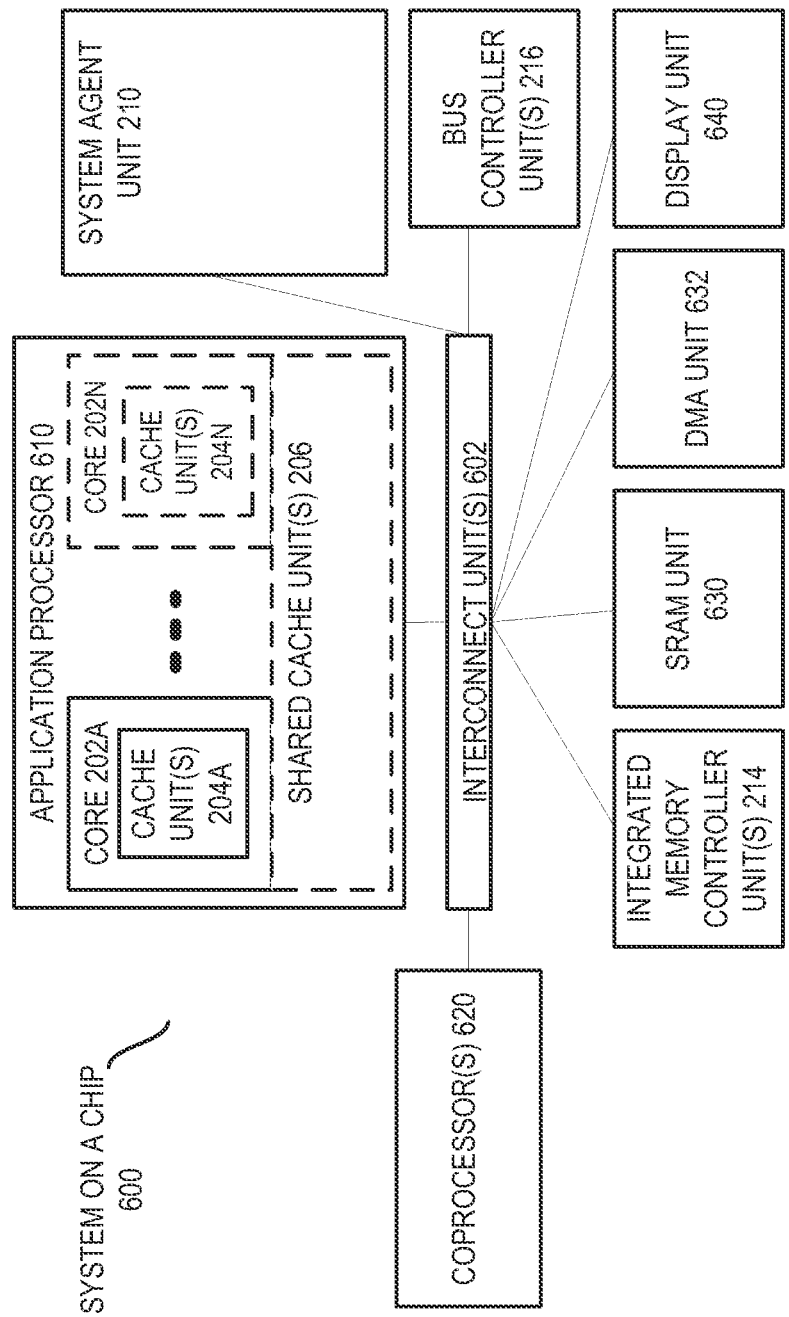
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N, cache 204A-N, and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; a static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor. The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products. In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
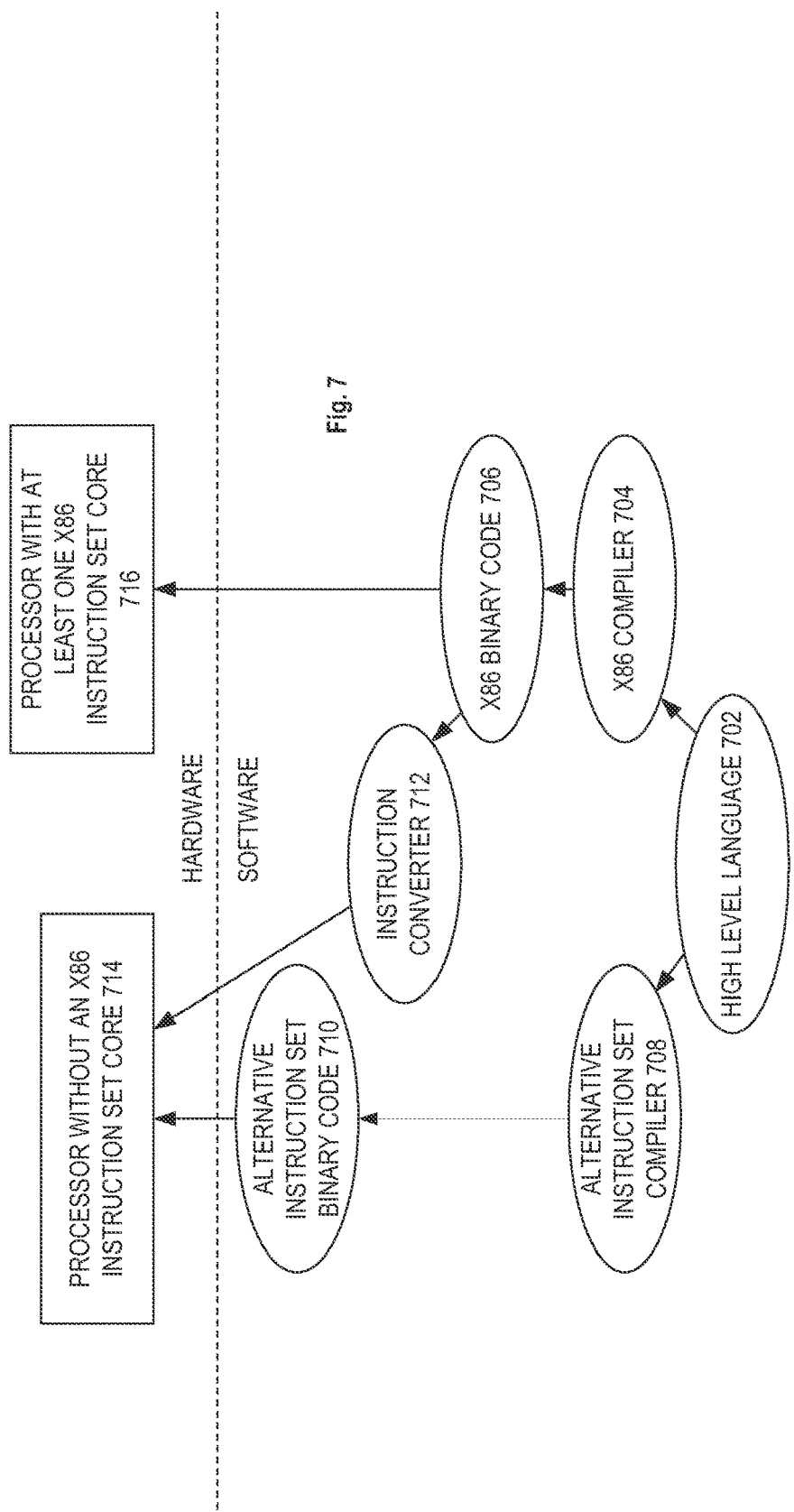
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716.

Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

APPARATUS AND METHOD FOR EMULATION OF ARCHITECTURAL PERFORMANCE MONITORING ON BINARY TRANSLATION SYSTEMS

The embodiments described below provide stronger security and compatibility for a binary translation system that emulates architectural performance counter behavior. Unlike prior implementations of binary translation of architectural performance monitoring that allow an end user to monitor binary translation facilities by observing differences in translated and non-translated code, the described embodiments may transparently emulate architectural performance monitoring, increasing security of the binary translation system and compatibility with existing software. In certain embodiments, an architectural performance counter may require strict emulation to be architecturally correct when the value of the architectural performance counter is a function of an end-user's code, for example, instructions retired, branch instructions retired, and branch misses retired, and a binary translation system which alters the executing code flow will also result in a change of these values. In certain embodiments, an architectural performance counter may not require strict emulation to be architecturally correct because its values may vary based on reasons other than a binary translation system altering the executing code flow, for example, un-halted core cycles, un-halted reference cycles, LLC reference, and LLC misses, and these values may not be a function of the executing code.

Figure 8:
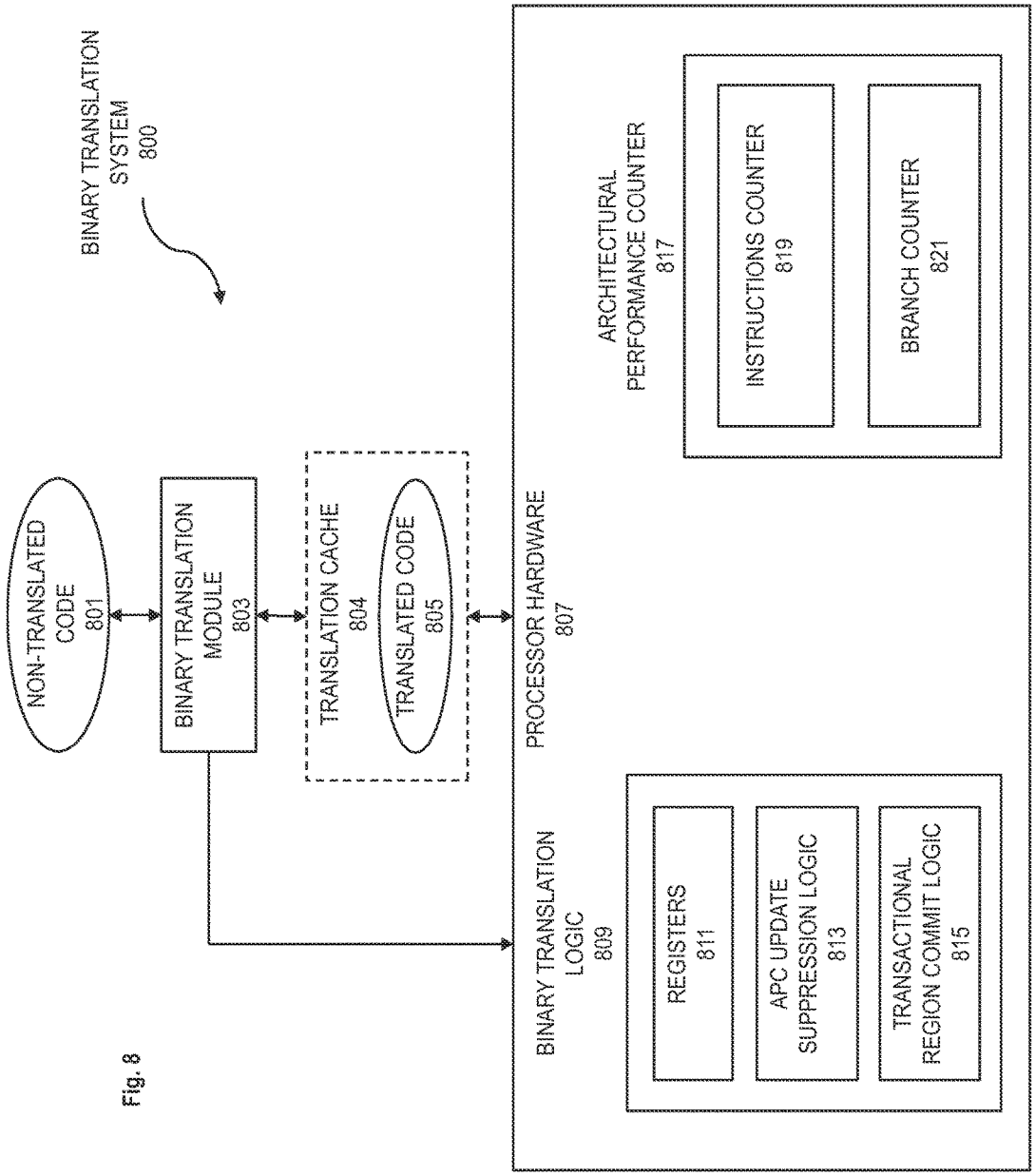
FIG. 8 is block diagram illustrating a binary translation system according to embodiments of the invention.

FIG. 8 illustrates one embodiment of a binary translation system 800 which may include a binary translation module 803 for translation of non-translated instructions (e.g., non-translated code 801) of one instruction set to translated instructions (e.g., translated code 805) of another instruction set. Non-translated code 801 may include, for example, instructions of an x86 ISA. However, the underlying principles of the invention are not limited to any particular instruction set. In one embodiment, the translated code 805 is stored in a translation cache 804, which may be implemented as a dedicated memory space for the translated code 805. The binary translation system 800 may also include processor hardware (e.g., processor hardware 807) for performing transparent emulation of performance monitoring services. Although shown separately from processor hardware 807, the binary translation module 803 may be part of processor hardware 807 and included within a unit or logic in processor hardware 807.

Processor hardware 807 may include binary translation logic (e.g., binary translation logic 809) and an architectural performance counter (e.g., architectural performance counter 817). In one embodiment, binary translation logic 809 includes registers 811, architectural performance counter update suppression logic 813, and transactional region commit logic 815. While the registers 811, architectural performance counter update suppression logic 813, and transactional region commit logic 815 are shown as part of the binary translation logic 809, any part of binary translation logic may be separate or included with another unit or logic in processor hardware 807. In one embodiment, the binary translation system 800 may embed values (e.g., architectural values for updating of the architectural performance counter 817) into a stream of translated instructions (e.g., translated code 805). The architectural value may be held in a register (e.g., registers 811) and only added to the architectural performance counter 817 upon successful completion of a transactional code region (e.g., a commit point). In one embodiment, if a transactional code region does not complete (e.g., the transactional code region aborts), the architectural value held in registers 811 may be discarded and the architectural performance counter 817 may retain its previous architectural value.

In one embodiment, the binary translation system 800 may have speculation support and speculative registers (e.g., registers 811) to store update values of the architectural performance counter 817. In one embodiment, instructions for updating the architectural performance counter 817 are private to the binary translation system 800 and only used by translated code. In one embodiment, architectural performance counter update suppression logic 813 may suppress automatic update on general instruction retirement, allowing for the execution of translated code without the retirement of instructions affecting the values of the architectural performance counter 817. In such an embodiment, the binary translation system 800, instead of having to ensure correct emulation on every instruction boundary, may only ensure that updates are correct at the completion of a transactional code region (e.g., a commit point), upon successful retirement of a commit instruction. Transactional region commit logic 815 may add a value (e.g., an architectural value for update of the architectural performance counter 817) from the registers 811 to the appropriate location within the architectural performance counter 817 on the successful retirement of a commit instruction.

In one embodiment, the architectural performance counter 817 may include an instructions counter (e.g., instructions retired counter 819) and a branch counter (e.g., branch counter 821). The instructions counter 819 and branch counter 821 may be set and/or adjusted by values that are embedded in a stream of translated instructions (e.g., translated code 805) by the binary translation system 800. While shown with only an instructions counter 819 and a branch counter 821, the architectural performance counter 817 may also include counters for other instructions and/or updates. In one embodiment, the binary translation system 800 may embed values into a stream of translated instructions (e.g., translated code 805) to set and/or adjust an instructions counter (e.g., instructions retired adjustments to instructions counter 819), as the number of instructions in a stream of translated instructions may not correspond with the number of instructions in a stream of non-translated instructions (e.g., non-translated code). In another embodiment, the binary translation system 800 may embed values into a stream of translated instructions to set and/or adjust a branch counter (e.g., branches retired adjustments to branch counter 821), as the number of branches in a stream of translated instructions may not correspond with the number of branches in a stream of non-translated instructions.

Figure 9:
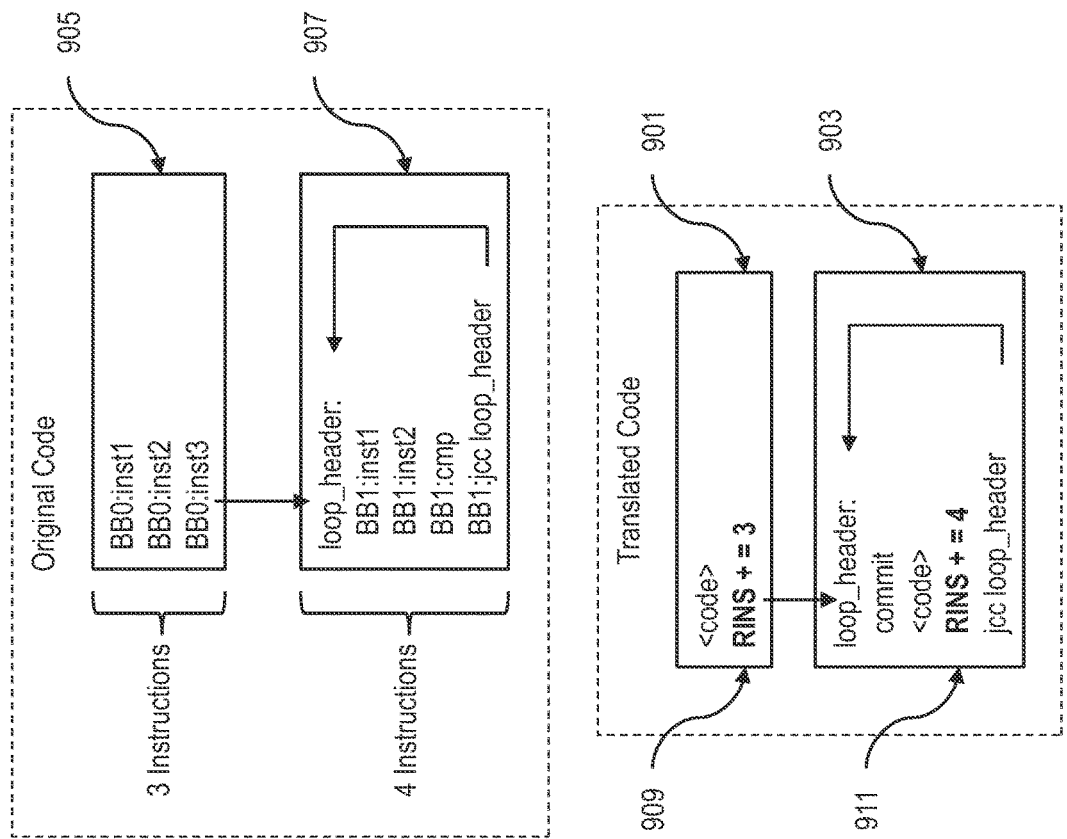
FIG. 9 is a block diagram of one embodiment of performance monitoring emulation by the binary translation system according to embodiments of the invention.

FIG. 9 is a block diagram of one embodiment of performance monitoring emulation by the binary translation system 800. Basic blocks containing translated instructions, for example, blocks 901 and 903 containing translated code, may vary in size from corresponding non-translated instructions, for example, blocks 905 and 907 containing original code (e.g., x86 code), depending on the type of binary translation system 800 or the operation the binary translation system is performing, for example, optimization or introspection. In one embodiment, the binary translation system 800 may embed an additional instruction explicitly into the translated code stream including, for example, a value updating and/or adjusting the architectural performance counter 817 by three instructions (e.g., instructions retired 909) or a value updating the architectural performance counter by four instructions (e.g., instructions retired 911). In one embodiment, an additional instruction including a value updating and/or adjusting the architectural performance counter 817 (e.g., instructions retired 909 or 911) may include x86-level information.

Figure 10:
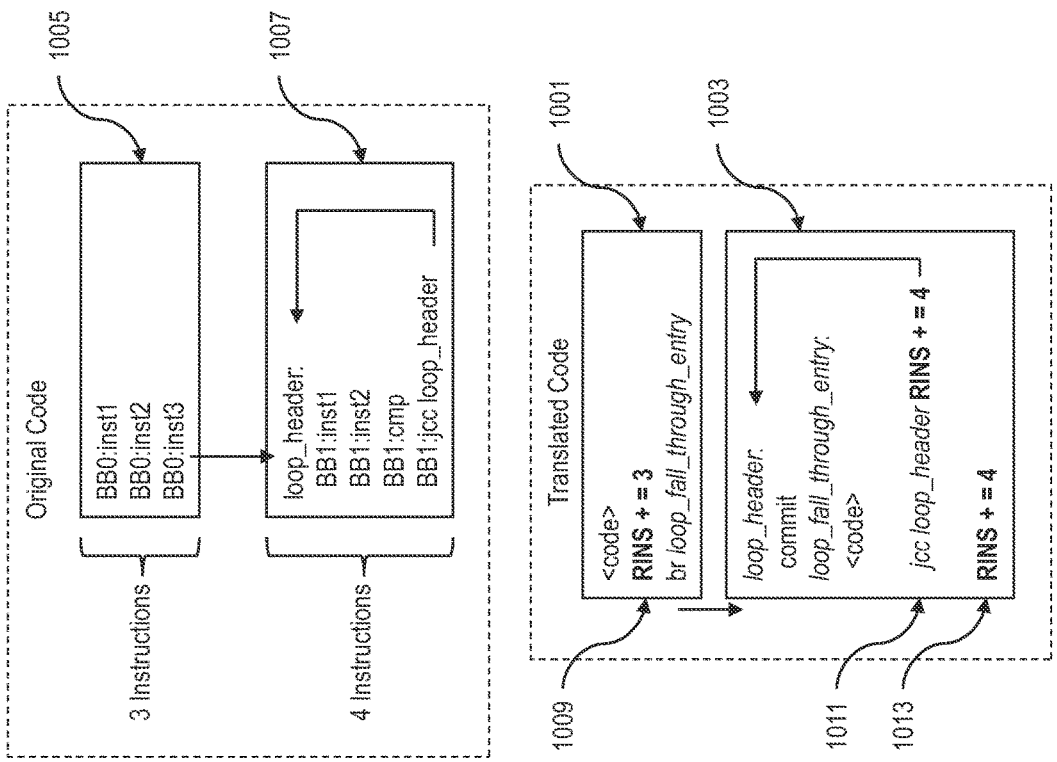
FIG. 10 is a block diagram of one embodiment of performance monitoring emulation by the binary translation system according to embodiments of the invention.

FIG. 10 is a block diagram of an alternative embodiment of performance monitoring emulation by the binary translation system 800. Basic blocks containing translated instructions, for example, blocks 1001 and 1003 containing translated code, may vary in size from corresponding non-translated instructions, for example, blocks 1005 and 1007 containing original code (e.g., x86 code), depending on the type of binary translation system 800 or the operation the binary translation system is performing. In one embodiment, the binary translation system 800, using a co-designed ISA, may be tuned to allow for embedding values (e.g., architectural values for updating and/or adjusting the architectural performance counter 817) into existing instructions. In one embodiment, an embedded value may include a value updating and/or adjusting the architectural performance counter 817 (e.g., 1009, 1011, or 1013) with x86-level information.

In one embodiment, branch correspondence may exist between basic blocks of translated code and non-translated code (e.g., branch instruction 1011 within block 1003 of translated code may correspond to the location of the branch within block 1007 of non-translated code). In such embodiments the binary translation system 800 may embed a value into a branch instruction of a stream of translated instructions (e.g., an architectural value updating and/or adjusting the architectural performance counter 817 by four instructions retired 1011). In one embodiment, branch correspondence may not exist between basic blocks of translated code and non-translated code (e.g., block 1001 of translated code may not correspond to a branch in non-translated code block 1005, and block 1003 of translated code may not correspond to a branch in non-translated code block 1007, respectively). In such embodiments the binary translation system 800 may embed a value, within the stream of translated instructions, into a special no-op instruction that does not correspond to a branch instruction (e.g., an architectural value updating and/or adjusting the architectural performance counter 817 by three instructions 1009, or by four instructions 1013).

Figure 11:
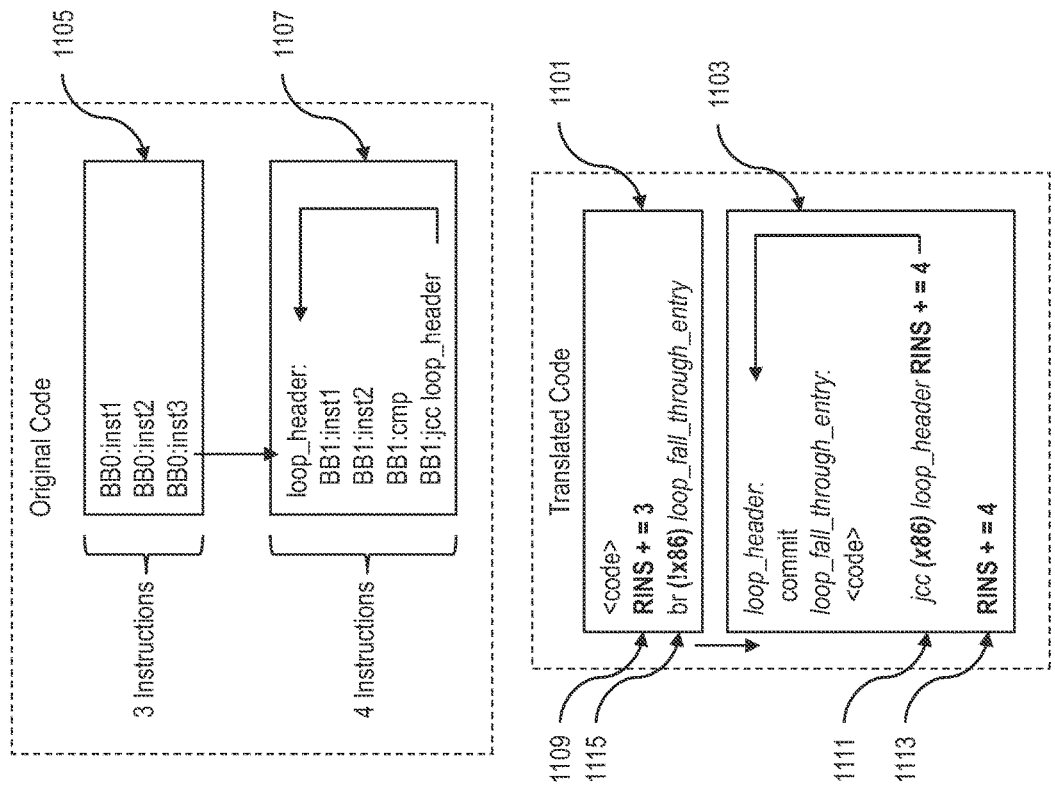
FIG. 11 is a block diagram of one embodiment of performance monitoring emulation by the binary translation system according to embodiments of the invention.

FIG. 11 is a block diagram of another alternative embodiment of performance monitoring emulation by the binary translation system 800. Basic blocks containing translated instructions, for example, blocks 1101 and 1103 containing translated code, may vary in size from corresponding basic blocks of non-translated instructions, for example, blocks 1105 and 1107 containing original code (e.g. x86 code), depending on the type of binary translation system 800 or the operation the binary translation system is performing. In one embodiment, the binary translation system 800, using a co-designed ISA, may be tuned to allow for embedding values (e.g., architectural values for updating and/or adjusting the architectural performance counter 817) into existing instructions. In one embodiment, an embedded value may include a value updating and/or adjusting the architectural performance counter 817 (e.g., 1109, 1111, or 1113) with x86-level information.

In one embodiment, branch correspondence may exist between basic blocks of translated code and non-translated code (e.g., branch instruction 1111 within block 1103 of translated code corresponding to the location of the branch within block 1107 of non-translated code). In such embodiments, the binary translation system 800 may embed a value into a branch instruction of a stream of translated instructions (e.g., an architectural value updating and/or adjusting the architectural performance counter 817 by four instructions retired 1111). In one embodiment, the binary translation system 800 may place information or symbols within a branch to indicate whether a branch should be considered in terms of updates to the architectural performance counter 817. For example, the binary translation system 800 may place a !x86 symbol in branch 1115 to indicate that it should not be considered for updating to the architectural performance counter 817, and may place a x86 symbol in branch 1111 to indicate that it should be considered for updating to the architectural performance counter 817. In one embodiment, branch correspondence may not exist between basic blocks of translated code and non-translated code (e.g., block 1101 of translated code may not correspond to a branch in non-translated code block 1105, and block 1103 of translated code may not correspond to a branch in non-translated code block 1107, respectively). In such embodiments, the binary translation system 800 may embed a value, within the stream of translated instructions, into a special no-op instruction that does not correspond to a branch instruction (e.g., an architectural value updating and/or adjusting the architectural performance counter 817 by three instructions 1109, or by four instructions 1113).

Figure 12:
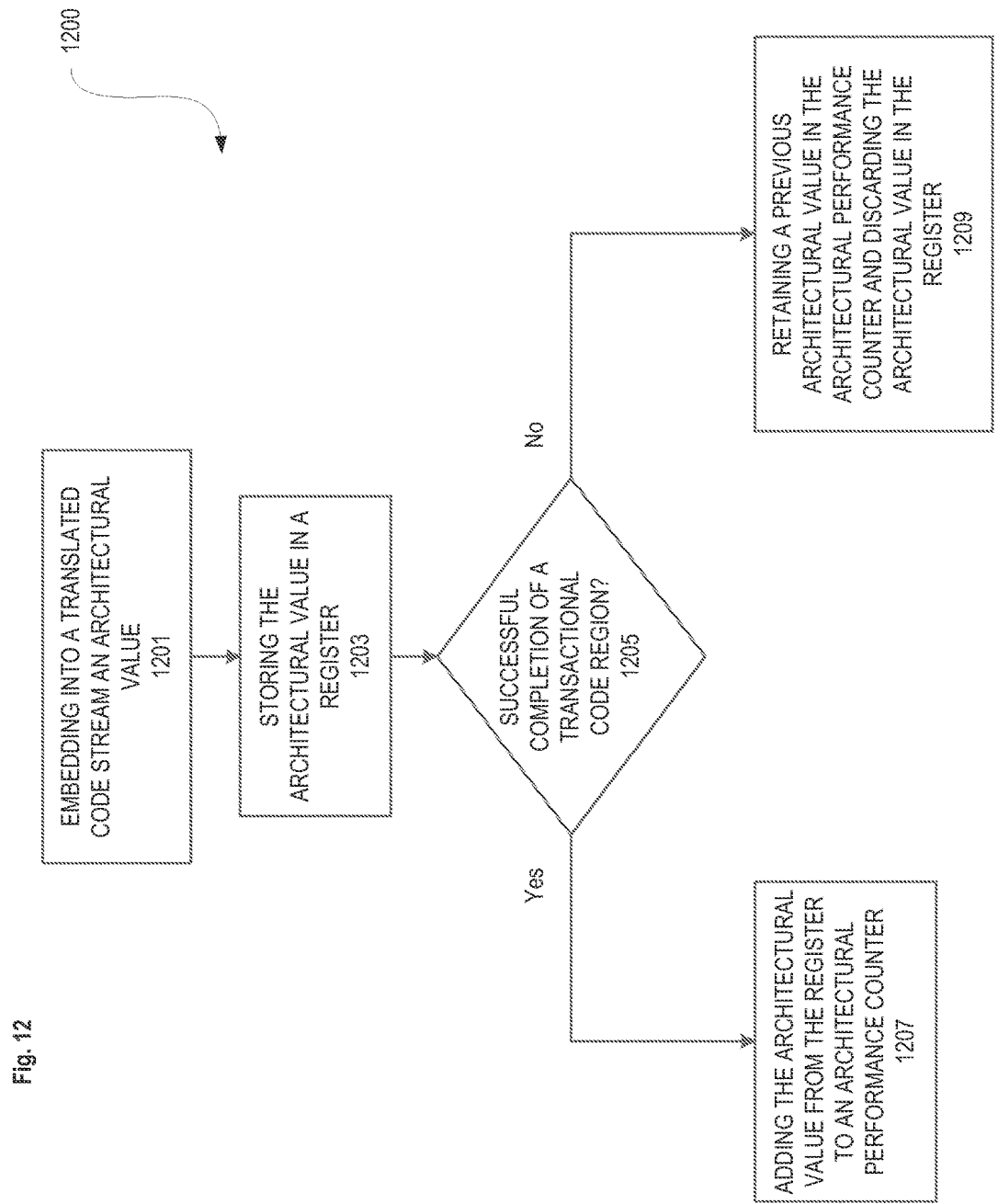
FIG. 12 is a flow diagram illustrating an exemplary method of emulating an architectural performance counter.

FIG. 12 is a flow diagram illustrating an exemplary method 1200 of emulating an architectural performance counter (e.g., architectural performance counter 817), with respect to the embodiment in FIG. 8. At 1201, a binary translation system (e.g., binary translation system 800) embeds an architectural value of the architectural performance counter 817 into a stream of translated instructions having a transactional code region. In one embodiment, an architectural value may be x86-level information for updating/adjusting the architectural performance counter 817 by instructions retired or branches retired. In one embodiment, the binary translation system 800 may embed an additional instruction (e.g., including a value updating and/or adjusting the architectural performance counter 817) explicitly into the translated code stream. In one embodiment, the binary translation system 800 may embed values (e.g., architectural values for updating and/or adjusting the architectural performance counter 817) into existing instructions. In one embodiment, where a branch instruction in a basic block of translated instructions corresponds to a branch instruction in a basic block of non-translated instructions, the binary translation system 800 may embed a value into the branch instruction of a stream of translated instructions (e.g., an architectural value updating and/or adjusting the architectural performance counter 817). In one embodiment, where a basic block of translated instructions does not have branch correspondence to a basic block of non-translated instructions, the binary translation system 800 may embed a value into a special no-op instruction that does not correspond to a branch instruction (e.g., an architectural value updating and/or adjusting the architectural performance counter 817).

At 1203, the architectural value may be held in a register (e.g., registers 811) and only added to the architectural performance counter 817 upon successful completion of a transactional code region (e.g., a commit point). In one embodiment, if a transactional code region does not complete (e.g., the transactional code region aborts), the architectural value held in registers 811 may be discarded and the architectural performance counter 817 may retain its previous architectural value. At 1205, the binary translation system 800 determines whether there has been a successful completion of a transactional code region. If a successful completion of a transactional code region has occurred, at 1207, the binary translation system 800 may add an architectural value (e.g., an architectural value for update of the architectural performance counter 817) from registers 811 to the appropriate location within the architectural performance counter 817. In one embodiment, transactional region commit logic (e.g., transactional region commit logic 815) in the binary translation system 800 may add the architectural value held in registers 811 to the appropriate location within the architectural performance counter 817. In one embodiment, at 1209, if a successful completion of a transactional code region has not occurred (e.g., the a transactional code region aborts), the binary translation system 800 may not add an architectural value (e.g., an architectural value for update of the architectural performance counter 817) from registers 811 to the appropriate location within the architectural performance counter 817, and may instead retain a previous architectural value in the architectural performance counter 817, discarding the architectural value in registers 811.

In one embodiment, a processor includes an architectural performance counter to maintain an architectural value associated with instruction execution, a register to store the architectural value of the architectural performance counter, binary translation logic to embed an architectural value from the architectural performance counter into a stream of translated instructions having a transactional code region and to store the architectural value into the register, an execution unit to execute the transactional code region of the stream of translated instructions, and the binary translation logic to add the architectural value from the register to the architectural performance counter upon completion of the transactional code region of the stream of translated instructions. The processor may further include architectural performance counter update suppression logic to suppress instruction retirement updates to the architectural performance counter; the architectural performance counter may receive an architectural value upon completion of the transactional code region of the stream of translated instructions and may not receive an architectural value when the transactional code region of the stream of translated instructions does not complete. The binary translation logic within the processor may further be configured to retain a previous architectural value in the architectural performance counter and discard the architectural value in the register when a transactional code region does not complete. The binary translation logic within the processor may further be configured to embed the architectural value into a branch instruction of the stream of translated instructions when the branch instruction within the stream of translated instructions has a corresponding location to a branch instruction within a set of non-translated instructions. The binary translation logic within the processor may further be configured to embed the architectural value into an additional instruction within the stream of translated instructions when there is no correspondence between a branch instruction within the stream of translated instructions and a branch instruction within the set of non-translated instructions. The binary translation logic within the processor may further be configured to embed information into a branch instruction of a stream of translated instructions to indicate whether the branch should be considered for updating to the architectural performance counter.

In another embodiment, a method includes maintaining an architectural value associated with instruction execution by an architectural performance counter, storing the architectural value of the architectural performance counter by a register, embedding the architectural value from the architectural performance counter by binary translation logic into a stream of translated instructions having a transactional code region and storing the architectural value into the register, executing the transactional code region of the stream of translated instructions by an execution unit, and adding the architectural value by the binary translation logic from the register to the architectural performance counter upon completion of the transactional code region of the stream of translated instructions. The method may further include suppressing instruction retirement updates to the architectural performance counter by architectural performance counter update suppression logic; the architectural performance counter may receive the architectural value upon completion of the transactional code region of the stream of translated instructions and may not receive the architectural value when the transactional code region of the stream of translated instructions does not complete. The method may further include retaining a previous architectural value in the architectural performance counter by the binary translation logic and discarding the architectural value in the register when a transactional code region does not complete. The method may further include embedding the architectural value by the binary translation logic into a branch instruction of the stream of translated instructions when the branch instruction within the stream of translated instructions has a corresponding location to a branch instruction within a set of non-translated instructions. The method may further include embedding the architectural value by the binary translation logic into an additional instruction within the stream of translated instructions when there is no correspondence between a branch instruction within the stream of translated instructions and a branch instruction within the set of non-translated instructions. The method may further include embedding information by the binary translation logic into a branch instruction of a stream of translated instructions to indicate whether the branch should be considered for updating to the architectural performance counter.

In another embodiment, a system includes a memory unit coupled to a first storage location configured to store an architectural value of an architectural performance counter, a processor coupled to the memory unit, the processor including a register file unit configured to store the architectural value of the architectural performance counter, binary translation logic to embed the architectural value from the architectural performance counter into a stream of translated instructions having a transactional code region and to store the architectural value into the register, a register to store the architectural value of the architectural performance counter, and architectural performance counter update suppression logic to suppress instruction retirement updates to the architectural performance counter; the architectural performance counter may receive the architectural value upon completion of the transactional code region of the stream of translated instructions and may not receive the architectural value when the transactional code region of the stream of translated instructions does not complete. The system may further include architectural performance counter update suppression logic to suppress instruction retirement updates to the architectural performance counter; the architectural performance counter may receive the architectural value upon completion of the transactional code region of the stream of translated instructions and may not receive the architectural value when the transactional code region of the stream of translated instructions does not complete. The binary translation logic within the system may further retain a previous architectural value in the architectural performance counter and discard the architectural value in the register when a transactional code region does not complete. The binary translation logic within the system may further be configured to embed the architectural value into a branch instruction of the stream of translated instructions when the branch instruction within the stream of translated instructions has a corresponding location to a branch instruction within a set of non-translated instructions. The binary translation logic within the system may further be configured to embed the architectural value into an additional instruction within the stream of translated instructions when there is no correspondence between a branch instruction within the stream of translated instructions and a branch instruction within the set of non-translated instructions. The binary translation logic within the system may further be configured to embed information into a branch instruction of a stream of translated instructions to indicate whether the branch should be considered for updating to the architectural performance counter.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   an architectural performance counter to maintain an architectural value associated with instruction execution;
   a register to store the architectural value of the architectural performance counter;
   hardware binary translation logic to embed an architectural value into a stream of translated instructions having a transactional code region and to store the embedded architectural value into the register; and
   an execution unit to execute the transactional code region of the stream of translated instructions;
   the hardware binary translation logic to add the embedded architectural value from the register to the architectural performance counter only upon completion of the transactional code region of the stream of translated instructions,
   wherein the hardware binary translation logic is further to embed the embedded architectural value into a branch instruction of the stream of translated instructions when the branch instruction within the stream of translated instructions has a corresponding location to a branch instruction within a set of non-translated instructions.

2. The processor of claim 1, further comprising:
   hardware architectural performance counter update suppression logic to suppress instruction retirement updates to the architectural performance counter, the architectural performance counter to receive an embedded architectural value upon completion of the transactional code region of the stream of translated instructions and to not receive an embedded architectural value when the transactional code region of the stream of translated instructions does not complete.

3. The processor of claim 2, wherein the hardware binary translation logic is further configured to retain a previous architectural value in the architectural performance counter and discard the embedded architectural value in the register when a transactional code region does not complete.

4. The processor of claim 1, wherein the hardware binary translation logic is further configured to embed the embedded architectural value into an additional instruction within the stream of translated instructions when there is no correspondence between a branch instruction within the stream of translated instructions and a branch instruction within the set of non-translated instructions.

5. The processor of claim 1, wherein the hardware binary translation logic is further configured to embed information into a branch instruction of a stream of translated instructions to indicate whether the branch should be considered for updating to the architectural performance counter.

6. The processor of claim 1, wherein the transactional code region is completed upon a retirement of a commit instruction in the transactional code region.

7. A method comprising:
maintaining by an architectural performance counter, an architectural value associated with instruction execution;
storing by a register, the architectural value of the architectural performance counter;
embedding by binary translation logic, an embedded architectural value into a stream of translated instructions having a transactional code region and storing the architectural value into the register;
executing by an execution unit, the transactional code region of the stream of translated instructions; and
adding by the binary translation logic, the embedded architectural value from the register to the architectural performance counter upon completion of the transactional code region of the stream of translated instructions
embedding by the binary translation logic, the embedded architectural value into a branch instruction of the stream of translated instructions when the branch instruction within the stream of translated instructions has a corresponding location to a branch instruction within a set of non-translated instructions.

8. The method of claim 7, further comprising:
suppressing by architectural performance counter update suppression logic, instruction retirement updates to the architectural performance counter, the architectural performance counter receiving the embedded architectural value upon completion of the transactional code region of the stream of translated instructions and not receiving the embedded architectural value when the transactional code region of the stream of translated instructions does not complete.

9. The method of claim 8, further comprising:
retaining by the binary translation logic, a previous architectural value in the architectural performance counter and discarding the embedded architectural value in the register when a transactional code region does not complete.

10. The method of claim 7, further comprising:
embedding by the binary translation logic, the embedded architectural value into an additional instruction within the stream of translated instructions when there is no correspondence between a branch instruction within the stream of translated instructions and a branch instruction within the set of non-translated instructions.

11. The method of claim 7, further comprising:
embedding by the binary translation logic, information into a branch instruction of a stream of translated instructions to indicate whether the branch should be considered for updating to the architectural performance counter.

12. A system comprising:
a memory unit coupled to a first storage location configured to store an architectural value of an architectural performance counter; and
a processor coupled to the memory unit, the processor comprising:
a register file unit configured to store the architectural value of the architectural performance counter;
hardware binary translation logic to embed an embedded architectural value into a stream of translated instructions having a transactional code region and to store the architectural value into the register;
a register to store the architectural value of the architectural performance counter; and
hardware architectural performance counter update suppression logic to suppress instruction retirement updates to the architectural performance counter, the architectural performance counter to receive the embedded architectural value upon completion of the transactional code region of the stream of translated instructions and to not receive the architectural value when the transactional code region of the stream of translated instructions does not complete,
wherein the hardware binary translation logic is further to embed the embedded architectural value into a branch instruction of the stream of translated instructions when the branch instruction within the stream of translated instructions has a corresponding location to a branch instruction within a set of non-translated instructions.

13. The system of claim 12, wherein the hardware binary translation logic is to retain a previous architectural value in the architectural performance counter and discard the embedded architectural value in the register when a transactional code region does not complete.

14. The system of claim 12, wherein the hardware binary translation logic is further configured to embed the embedded architectural value into an additional instruction within the stream of translated instructions when there is no correspondence between a branch instruction within the stream of translated instructions and a branch instruction within the set of non-translated instructions.

15. The system of claim 12, wherein the hardware binary translation logic is further configured to embed information into a branch instruction of a stream of translated instructions to indicate whether the branch should be considered for updating to the architectural performance counter.

16. The system of claim 12, wherein the transactional code region is complete upon a successful retirement of a commit instruction in the transactional code region.

* * * * *